United States Patent
Pradelle

(10) Patent No.: US 8,596,646 B2
(45) Date of Patent: Dec. 3, 2013

(54) Y-SHAPED GASKET, A METHOD OF FABRICATING SUCH A GASKET, AND THE USE OF SUCH A GASKET FOR REDUCING THE ENGAGEMENT FORCES OF A CONNECTOR

(75) Inventor: Sébastien Pradelle, Maisoncelles du Maine (FR)

(73) Assignee: Le Joint Francais, Paris (FR)

( * ) Notice: Subject to any disclaimer, the term of this patent is extended or adjusted under 35 U.S.C. 154(b) by 1023 days.

(21) Appl. No.: 12/044,345

(22) Filed: Mar. 7, 2008

(65) Prior Publication Data

US 2008/0277879 A1 Nov. 13, 2008

(30) Foreign Application Priority Data

Mar. 7, 2007 (EP) ..................................... 07290296

(51) Int. Cl.
*F16J 15/32* (2006.01)
(52) U.S. Cl.
USPC .......................................... 277/627; 277/626
(58) Field of Classification Search
USPC .................................. 277/607, 616, 626, 627
See application file for complete search history.

(56) References Cited

U.S. PATENT DOCUMENTS

| | | | |
|---|---|---|---|
| 2,914,345 A | | 11/1959 | Osborn |
| 2,916,306 A | | 12/1959 | Rickard |
| 3,378,269 A | * | 4/1968 | Castor ............................ 277/336 |
| 4,182,519 A | | 1/1980 | Wilson |
| 4,572,523 A | * | 2/1986 | Guettouche et al. .......... 277/616 |
| 4,658,847 A | * | 4/1987 | McCrone ......................... 137/72 |
| 5,324,083 A | * | 6/1994 | Vogelsang ..................... 285/110 |
| 5,346,230 A | * | 9/1994 | Schumacher et al. ......... 277/551 |
| 2002/0185823 A1 | * | 12/2002 | Graber ........................... 277/626 |
| 2006/0181031 A1 | * | 8/2006 | Corbett et al. ................. 277/616 |

FOREIGN PATENT DOCUMENTS

| | | |
|---|---|---|
| EP | 0 783 082 A1 | 7/1997 |
| FR | 2 649 354 A1 | 1/1991 |
| GB | 759666 | 10/1956 |
| GB | 1 331 448 | 9/1973 |
| JP | 2001-254832 | 9/2001 |

* cited by examiner

*Primary Examiner* — Gilbert Lee

(74) *Attorney, Agent, or Firm* — Alston & Bird LLP

(57) ABSTRACT

The invention seeks to provide a gasket for a quick connector that is inexpensive to fabricate, providing sealing over a wide range of fluid pressures, while presenting engagement forces that are small for flow diameters of large size. More precisely, the present invention provides a sealing gasket of elastically deformable material having a Y-shaped longitudinal axial section for use in a quick coupling for a fluid duct, the gasket (10) comprising an I-shaped stem (1) and a V-shaped portion (2), flash (3p, 3s) of join plane (P1) of the gasket being located between the I-shaped stem (1) and the V-shaped portion (2), preferably substantially perpendicularly to the longitudinal axis (P2) of the gasket (10). The invention also provides the use of such a gasket, and a mold and a method for fabricating such a gasket.

24 Claims, 6 Drawing Sheets

Y-SHAPED GASKET, A METHOD OF FABRICATING SUCH A GASKET, AND THE USE OF SUCH A GASKET FOR REDUCING THE ENGAGEMENT FORCES OF A CONNECTOR

CROSS REFERENCE TO RELATED APPLICATIONS

This application claims priority from European patent application 07290296.8, filed Mar. 7, 2007.

FIELD AND BACKGROUND OF THE INVENTION

The present invention relates to a Y-shaped gasket, to a method of fabricating such a gasket, and to the use of such a gasket for reducing the engagement forces of a connector.

With the increasing use of quick connectors, in particular in the automobile industry, developing sealing techniques that have little influence on the engagement forces of such connectors is becoming a major preoccupation. These requirements relate to all fluids such as for example fuel (gasoline, diesel, biofuel), cooling liquid, brake liquid, urea, air, or oil. Certain applications are more critical because of the size of the connectors, such as air duct connectors used mainly for diesel engines, or water duct connectors used in heavy goods vehicles, for example.

The gasket most commonly used in such connectors is an O-ring, because it is inexpensive. Nevertheless, the forces required for engaging a connector fitted with such a gasket are high, in particular when the size of the gasket and/or its compression force increase.

Conventional shaped-section or lip gaskets are generally expensive to fabricate and require a housing that is complex. Furthermore, the fineness of their lips makes them more sensitive to thermal aging and to creep than the above-described solutions.

Finally, Y-gaskets are already known, but they are fabricated using three-matrix molds (one matrix for each branch of the Y-shape) that are difficult and expensive to implement. Furthermore, they lead to flash being formed in the join plane in zones that are functional in terms of mounting and/or sealing (in particular in the recess between the top lips of the Y-shape), thereby harming the intended operation of such zones. Those gaskets have therefore not been used in such couplings for the purpose of reducing engagement forces.

From the above, it can be seen that the greater the fluid flow diameter, the greater the size of the gasket and the greater the engagement forces.

SUMMARY OF THE INVENTION

The invention seeks to propose a gasket for a quick connector (snap-fastening or coupling) that is inexpensive to fabricate, that is suitable for being used instead of and replacing an O-ring or a four-lobe gasket, and that is capable of doing so without modifying the dimensions of the housings for such gaskets so as to avoid leading to costs associated with modifying existing parts, while providing sealing over a wide range of fluid pressures and presenting engagement forces that are small, preferably lying in the range 60 newtons (N) to 80 N for flow diameters of large size, e.g. about 50 millimeters (mm).

More precisely, the present invention provides a sealing gasket of elastically deformable material having a Y-shaped longitudinal axial section for use in a quick coupling for a fluid duct, the gasket comprising an I-shaped stem and a V-shaped portion, flash of join plane of the gasket being located between the I-shaped stem and the V-shaped portion, preferably substantially perpendicularly to the longitudinal axis of the gasket.

In preferred embodiments:

the gasket may present an I-shaped stem and a V-shaped portion presenting maximum axial lengths (X/2) that are substantially equal, the flash of join plane being located between the I-shaped stem and the V-shaped portion, substantially in the middle of the gasket;

for the V-shaped portion determining a main lip and a secondary lip, the ratio of the nominal length of the secondary lip to the nominal length of the main lip may be selected to be greater than or equal to 1.2, and no greater than 2;

the ratio of the length of the main lip in the longitudinal axis direction to the length of the secondary lip in the longitudinal axial direction may be selected to be strictly less than 1, preferably to lie in the range 0.6 to 0.9, typically in the range 0.75 to 0.85;

the ratio of the distance between the recess in the V-shaped portion and the join plane to the nominal length of the main lip may lie in the range 0.4 to 0.45;

for the sealing gasket designed to be inserted in a groove of a first endpiece of the connector and for coming into leaktight contact with a wall of the other endpiece, the ratio of the height of the gasket section in the join plane to the distance between the bottom of the groove and the wall of the second endpiece may be selected to be strictly less than 1, typically to lie in the range 0.7 to 0.98, and preferably in the range 0.8 to 0.9;

for the gasket presenting a maximum radial height between the two lips, the amount of deformation of the main lip may lie in the range 18% to 22% of the maximum radial height;

the amount of deformation of the secondary lip may be less than the amount of deformation of the first lip;

the amount of deformation of the secondary lip may lie in the range 9% to 11% of the maximum radial height;

the I-shaped stem and the main lip may form respective angles with the longitudinal axis of the gasket, the angle of the I-shaped stem being smaller than the angle of the main lip;

the angle of the I-shaped stem may be greater than or equal to 2°, and the angle of the main lip may be less than or equal to 30°;

the secondary lip and the I-shaped stem may present respective lobes at their free ends for coming into contact with a groove bottom;

the I-shaped stem and the secondary lip may form between them an angle such that a concave side is provided between the free end of the I-shaped stem and the free end of the secondary lip;

the main lip may present a free end face that is substantially plane;

the secondary lip may present a free end face that is substantially plane;

the I-shaped stem may present a free end face that is substantially plane;

the I-shaped stem may present a wedging lobe for coming into contact with a groove edge by stressing the gasket in the groove; and its material is selected from polymer materials, in particular from: FPM; HNBR; AEM; ACM; NBR; and EPDM.

The invention also relates to the use of a gasket as defined above in a fluid duct connector comprising a male endpiece and a female endpiece for the purpose of reducing the engagement forces of the male and female endpieces.

In preferred uses:
- the gasket may be placed in a groove in an endpiece such that the secondary lip bears against the bottom of the groove; and
- the gasket may be placed in the groove of an endpiece such that the V-shaped portion is disposed in a direction opposite to the pressurized fluid flow direction, and when the fluid flows, the main lip and the secondary lip are pressed respectively against the groove and against the other endpiece so as to reinforce sealing.

The invention also provides a mold for fabricating the above gasket, the mold comprising a first matrix provided with a first cavity in the form of the I-shaped stem, and a second matrix provided with a second cavity in the form of the V-shaped portion, the depths of the two cavities being substantially such that the flash in the join plane is located between the I-shaped stem and the V-shaped portion. For example, the depths of the two cavities are substantially equal to as to form flash in the join plane substantially in the middle of the gasket.

Finally, the invention relates to a method of fabricating the above gasket implementing the above mold and comprising the steps consisting in:
- pressing the two matrices against each other so that the two cavities face each other;
- injecting or placing non-cross-linked polymer material in the cavity;
- causing said polymer material to cross-link, at least in part; and
- unmolding the gasket by moving the matrices apart from each other, but not until the polymer material has cross-linked sufficiently for the main and secondary lips to be capable of deforming during unmolding and of returning to their molded shapes after unmolding.

BRIEF DESCRIPTION OF THE DRAWINGS

Other characteristics of the invention appear from the following detailed description made with reference to the accompanying drawings, which show, in particular.

DETAILED DESCRIPTION

The gasket described below needs to be made of a material that is elastically deformable. The material of the gasket is preferably selected from polymer materials, in particular from fluorocarbon rubber (FPM), hydrogenated nitrile butadiene rubber (HNBR), ethylene-co-methyl acrylate (AEM), a copolymer of ethyl (or other) acrylate and a copolymer providing reactive sites for vulcanization (ACM), nitrile rubber (NBR), and ethylene propylene diene terpolymer (EPDM).

Figure 1:
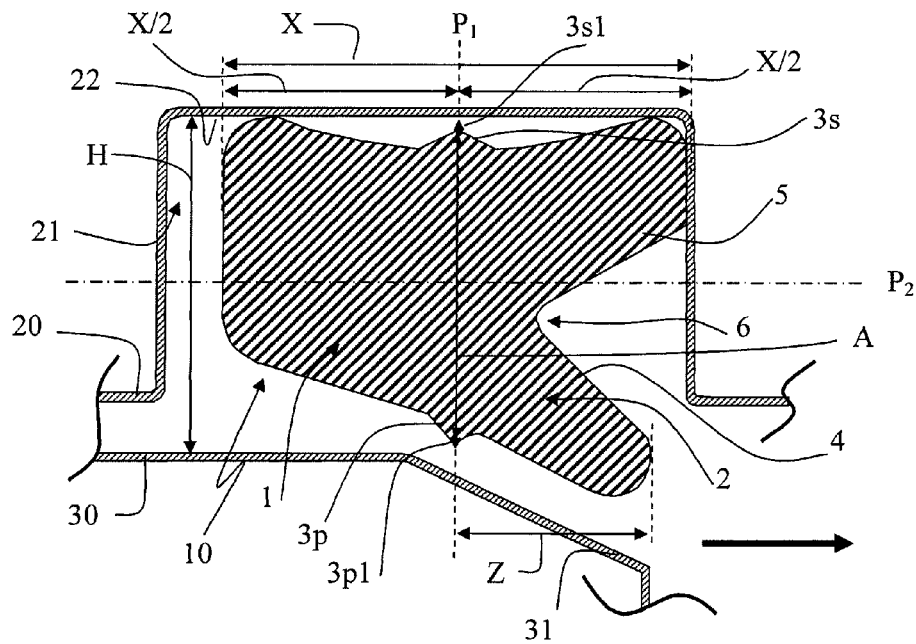
FIGS. 1 to 3: section views of a gasket of the invention that is "bore-mounted"
Figure 2:
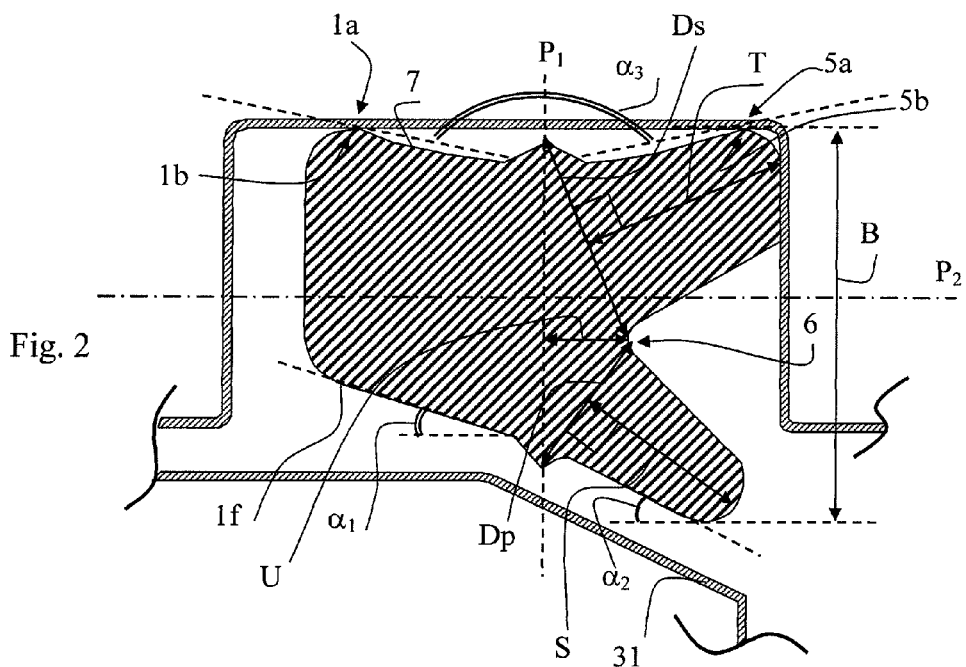
Figure 3:
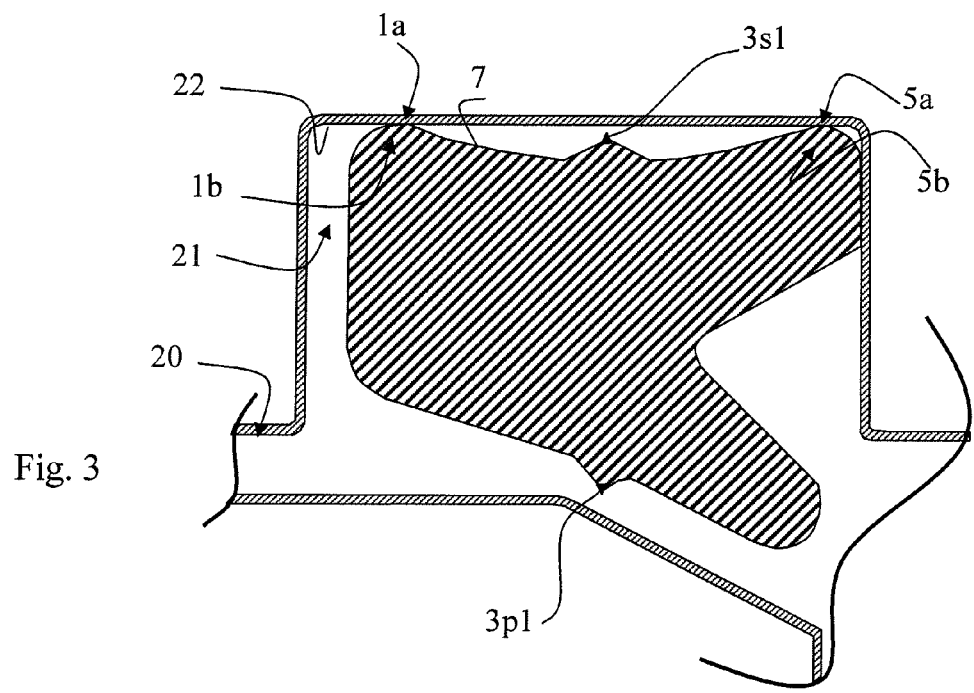

With reference to FIGS. 1 to 3, a gasket 10 of the invention presents a longitudinal axial section that is generally Y-shaped, with a longitudinal axial length X, the longitudinal axial length being defined as the length of the gasket in projection onto the longitudinal axis P2 of the gasket 10.

The gasket 10 presents an I-shaped stem 1 and a V-shaped portion 2 determining a main lip 4 and a secondary lip 5, the portions 1 and 2 being united via beads 3p and 3s situated in the join plane. The beads 3p, 3s are substantially triangular in shape, with flash 3p1 and 3s1 in the join plane at the tips of the beads. The beads 3p, 3s, and thus the flash 3p1 and 3s1 are in alignment on a straight line P1 perpendicular to the longitudinal axis P2 of the gasket 10. The straight line P1 represents the join plane, i.e. the plane of contact between the two matrices of the mold (see the description below of FIGS. 10 to 13). In the embodiment shown, the I-shaped portion 1 and the V-shaped portion 2 present maximum longitudinal axial lengths X/2 that are substantially equal, i.e. the beads, and thus the flash in the join-plane, are located between the I-shaped stem and the V-shaped portion, substantially halfway along the gasket 10.

The fact of making a bead on the gasket reduces stresses in the join plane during unmolding, thereby avoiding damage to the gaskets. Consequently, the reject rate is decreased, which has a positive economic impact.

The beads 3p and 3s also serve to offset the flash away from the solid portion of the gasket, thereby making it easier to remove the flash, e.g. cryogenically. Flash is thus better controlled.

The flash in the join plane, an inevitable fabrication defect, is thus located in a portion of the gasket that does not perform any functional role. The main and secondary lips 4 and 5 can deform towards each other without being impeded by flash situated in the recess 6 between them. Similarly, the flash has no influence on sealing since it lies away from the contact zones of the gasket with the groove 20 and the endpiece 30.

The gasket is "bore-mounted" in a groove 21 of a female endpiece 20, i.e. since the gasket 10 is circular, the main lip 4 points towards the center of the gasket 10 while the secondary lip 5 and the I-shaped portion 1 are compressed against the bottom 22 of the groove 21.

As shown in the figures taken together, the ends 1a and 5a respectively of the I-shaped stem 1 and of the secondary lip 5 are aligned parallel to the longitudinal axis P2. This characteristic enables the gasket to be optimally positioned as soon as it is installed in the groove, without imparting twisting to the gasket and thus without running any risk of the gasket escaping from the groove while being compressed.

The ratio of the longitudinal axial length Z of the main lip 4 to the longitudinal axial length X/2 of the secondary lip 5 is preferably selected to be strictly less than 1. This ratio X/2Z serves to reduce the risk of the main lip jamming in the groove 21 during engagement and deformation of the lip, thereby improving the quality and the effectiveness of the gasket. The best results are obtained for a ratio X/2Z that lies preferably in the range 0.6 to 0.9, and typically in the range 0.75 to 0.85.

Alternatively, or in combination, the ratio of the nominal length T (FIG. 2) of the secondary lip 5 to the nominal lip S of the main lip 4 can be selected to be greater than or equal to 1.2. The nominal length of a lip is defined as being the length of the lip from the base of the lip 4, 5 to its distal end 4a, 5a, where the base of the lip 4, 5 is defined by the straight line Dp-Ds passing through the recess 6 of the V-shaped portion 2 and the bead 3p, 3s adjacent to the lip 4, 5. Since the main lip 4 is shorter than the secondary lip 5, the risks of the main lip 4 jamming in the groove is reduced. Jamming of the main lip 4 between the groove 20 and the endpiece 30 would completely prevent the connector from engaging. Sealing quality is also improved. After the engagement stage, contact between the main lip and the lip 22 would prevent the fluid for sealing from passing into the V-shaped zone and thus prevent proper operation of the gasket.

Furthermore, the ratio of the distance U between the recess 6 of the V-shaped portion 2 and the join plane P1, to the nominal length of the main lip preferably lies in the range 0.4 to 0.45. When less than 0.40, there is an increased risk of tearing or more generally of damaging the surface of the main lip 4 while unmolding during fabrication of the gasket 10 (see the description below of FIGS. 10 to 13) and during repeated engagement and disengagement of the male and female endpieces of the connector. When greater than 0.45, the deformability of the main lip 4 is decreased and consequently engagement forces are increased. The increase in the stiffness of the main lip also influences the stability of the gasket during mounting by increasing the risk of capsizing.

In addition, the ratio of the height A of the section of the gasket 10 in the join plane P1 to the distance H between the bottom 22 of the groove 21 and the wall 31 of the second endpiece 30 of the connector can be selected to be strictly less than 1. By means of this ratio, the gasket is not compressed radially, i.e. in the direction P1, by the other endpiece of the connector, thereby further reducing engagement forces. For greater safety, the ratio H/A is preferably selected to lie in the range 0.7 to 0.98, and typically in the range 0.8 to 0.9.

Thus, a gasket as described above enables the main lip 4 to deform during mutual engagement of the two endpieces 20 and 30.

In a preferred embodiment, the gasket 10 presents a maximum radial height B between the two lips 4, 5 and the amount of deformation of the main lip 4 lies in the range 18% to 22% of the maximum radial height B. This amount enables deformation to be sufficient to reduce the engagement forces while ensuring the main lip 4 is pressed against the other endpiece 30 of the connector in a manner that is appropriate for ensuring sealing (see FIGS. 7 to 9).

Preferably, the amount of deformation of the secondary lip 5 is less than the amount of deformation of the main lip 4. Thus, by deforming, the secondary lip 5 contributes to the general resilience of the gasket 10, but because the amount it deforms is less than that of the main lip 4, the engagement force is exerted mainly against the main lip 4 with little being transmitted to the secondary lip. The thickness and the stiffness of the main lip 4 generates a reaction force pressing the main lip 4 against the endpiece 30 and ensuring sealing against the wall 31. On the other side, against the bottom 22 of the groove 21, sealing is provided by compressing the bore-mounted gasket 10. The amount of deformation of the secondary lip 5 can preferably be selected to lie in the range 9% to 11% of the maximum radial height B.

The engagement forces can also be reduced by reducing friction between the gasket 10 of a first endpiece 20 and the contact face of the second endpiece 30.

Each of the faces $1f$ of the I-shaped stem 1 and of the main lip 4 preferably forms an angle with the longitudinal axis P2 of the gasket 10, the angle $\alpha 1$ of the I-shaped stem 1 being less than the angle $\alpha 2$ of the main lip 4. The angle $\alpha 1$ of the I-shaped stem 1 may be greater than or equal to 2°. In addition, adapting this angle $\alpha 1$ makes it possible to obtain a greater or smaller volume of material for the gasket 10. Thus, the larger this angle, the less material there is in the gasket. The more the diameter of the connector increases, the greater the risk of the gasket 10 twisting in the groove 21 in a bore-mounted configuration. An increase in the quantity of material thus decreases the risk of twisting, thereby improving the stability of the gasket during mounting. A large angle $\alpha 1$ is therefore preferred for a gasket that is intended for a small-diameter connector, and a smaller angle $\alpha 1$, down to 2°, is preferred for a gasket intended for a larger-diameter connector. The angle $\alpha 1$ also represents an economic adjustment variable. When the cost of the material is high, a large $\alpha 1$ can have a non-negligible economic impact.

The angle of the main lip may be less than or equal to 30°. This angle $\alpha 2$ is determined by constraints of the fabrication method. When greater than 30°, it becomes difficult to unmold the gasket from a two-matrix mold and there is an increased risk of the lip tearing during unmolding (see the description below of FIGS. 10 to 13). This phenomenon, and thus the limiting values, depends on the material used.

Beside the bottom of the gasket 21, the I-shaped stem 1 and the secondary lip 5 preferably form between them an angle $\alpha 3$ such that a concave side 7 is formed between the free ends 1a and 5a of the I-shaped stem 1 and the secondary lip 5. This concave side serves firstly to allow the gasket 10 to be flattened against the bottom 22 of the groove 21, and secondly enables the functional contact zones of the gasket 10 against the endpiece 20 on which it is mounted to avoid coinciding with the position of the join plane and the bead $3s$ carrying the flash $3s1$. When using a bore-mounting, this concave side enables the outside diameter of the gasket to be compressed against the bottom of the groove.

The angle $\alpha 3$ is substantially symmetrical about the join plane, i.e. the secondary lip and the I-shaped stem forms substantially the same angle relative to the join plane for forming the concave side 7. This makes it possible to distribute stresses symmetrically in the join plane when it is positioned on the grooved bottom 22 or 22' (FIG. 4).

In order to maintain sealing during compression of the gasket 10 against the bottom 22 of the groove 21, the secondary lip 5 and the I-shaped stem 1 both present at their respective free ends $5a$ and $1a$, respective lobes $5b$ and $1b$ for coming into contact with the bottom of a groove. Limiting the contact zone to two contact zones makes it possible locally to achieve greater contact pressures in each of these zones. The lobes $1b$ and $5b$ at the ends $1a$ and $5a$ are in alignment parallel to the longitudinal axis P2. This characteristic enables the positioning of the gasket to be optimized on being installed in the groove, without inducing twisting of the gasket and thus avoiding any risk of the gasket escaping from the groove while being compressed.

Figure 4:
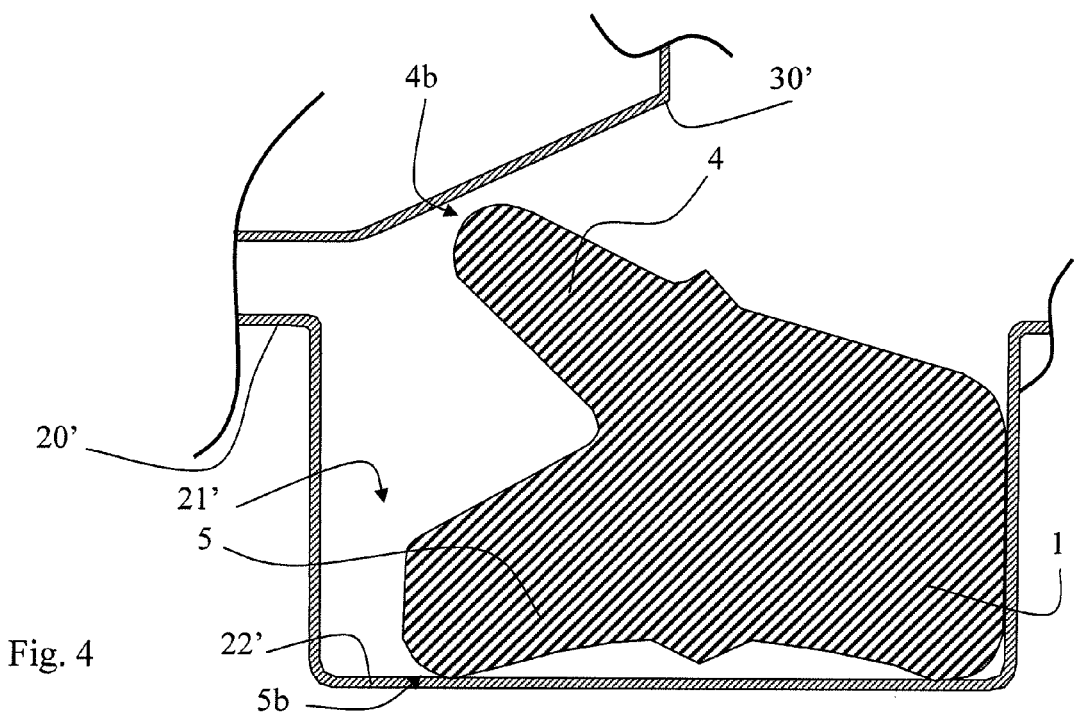
FIG. 4: a section view of a gasket of the invention that is "piston-mounted"

When the gasket of the invention is used in a connector for reducing the engagement forces required on the male and female endpieces, the gasket may either be "bore-mounted" as described above, or else it may be "piston-mounted", as shown in FIG. 4, i.e. since the gasket 10 is circular, the main lip 4 extends away from the center and is directed towards the outside of the gasket 10, with the secondary lip 5 and the I-shaped portion 1 being pressed against the bottom 22' of the groove 21' disposed in the outer periphery of the endpiece 20'.

The main lip 4 and the secondary lip 5 are preferably terminated by respective rounded lobes $4b$ and $5b$. This facilitates unmolding during fabrication. In addition, the lobe $4b$ serves to provide sealing while limiting the contact area with the endpiece 30', thereby reducing engagement forces.

In preferred manner, the maximum width of the groove is slightly greater than the axial length X of the gasket 10 so as to ensure the gasket is properly positioned in the groove.

However, during engagement, stress is exerted against the main lip 4 of the gasket 10 and transmitted to the entire gasket. Although flexible, the gasket does not absorb all of this stress and its intrinsic stiffness tends to cause the gasket to capsize. In order to limit this phenomenon, the secondary lip 5 and/or the I-shaped stem I may present a respective face $5c$, $1c$ at the respective free end $5a$, $1a$ that is substantially plane.

Figure 5:
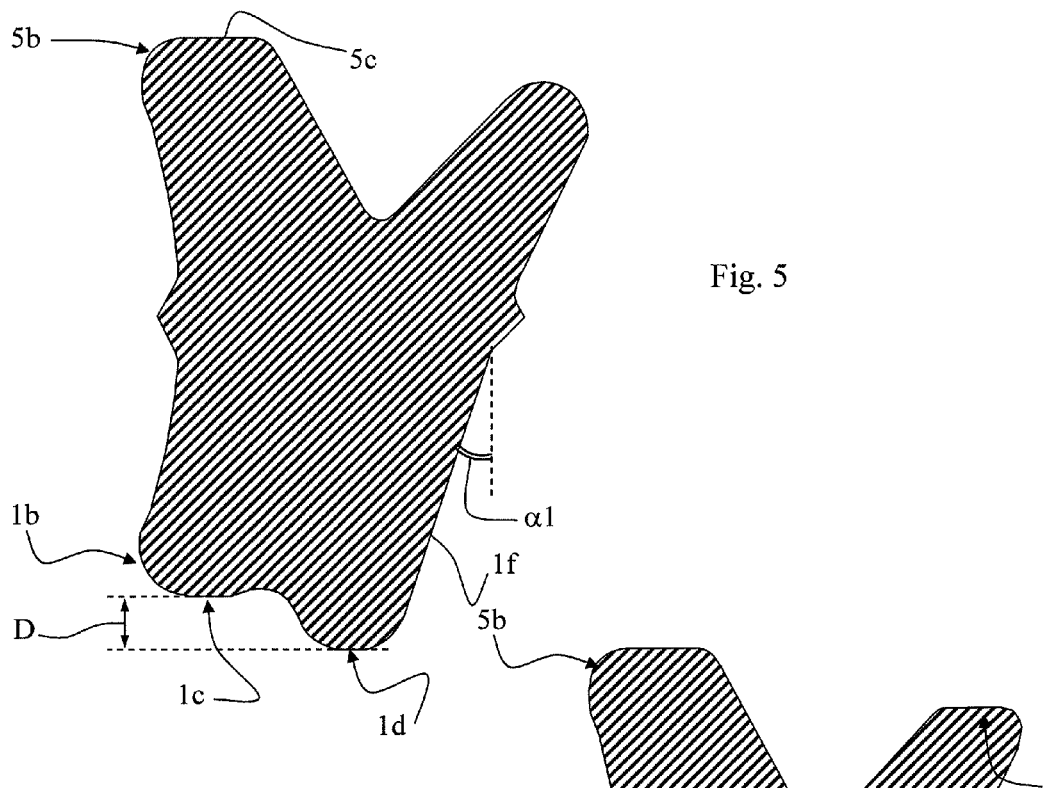
FIGS. 5 and 6: section views of variant gaskets of the invention.

Alternatively, and as shown in FIG. 5, the face 1c of the I-shaped stem 1 may present a wedging lobe 1d for coming into contact with an edge 23 of the groove 21 by stressing the gasket in this groove, thus making it possible to avoid the gasket 10 capsizing during a stage of connector engagement, but requiring the gasket to be stressed in the groove. This lobe needs to be defined in such a manner that axial compression of the gasket is possible while conserving the capacity for the gasket to be tightened radially. For this purpose, the lobe 1d projects beyond the lobe 1b, so that an offset D is sufficient to ensure prestressing on the gasket to hold it in the groove and thus prevent it from capsizing. A part having this design is particularly suitable for bore-mounting.

The main lip may also present a face 4c at its free end 4a that is substantially plane, thereby making it possible to reduce the risks of liquid passing between the main lip and the wall of the endpiece against which it is pressed.

Figure 6:
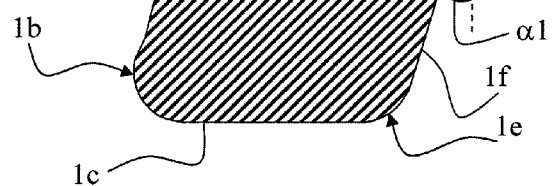

With reference to FIGS. 5 and 6, the lobe 1d (FIG. 5) or the rounded edge 1e (FIG. 6) connects the face 1c to the face 1f that is inclined at an angle α1. This lobe improves unmolding, makes it easier to prepare the mold, and reduces mold wear since there is no sharp threshold.

Figure 7:
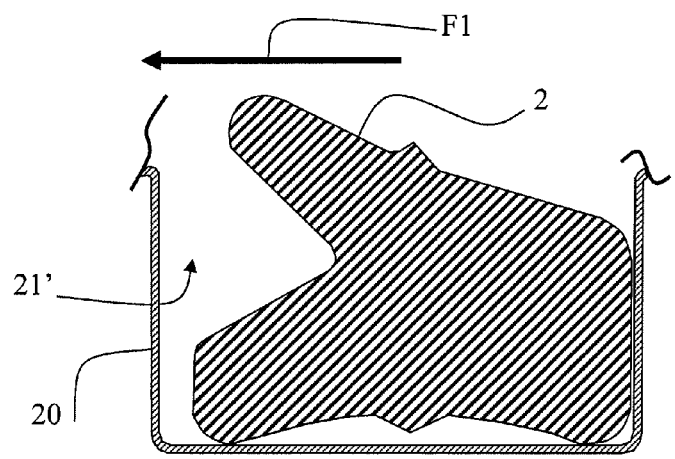
FIGS. 7 to 9: section views of a gasket of the invention that is "piston-mounted" prior to engagement, after engagement, and in use with a flowing fluid under a pressure of 3.5 bars.
Figure 8:
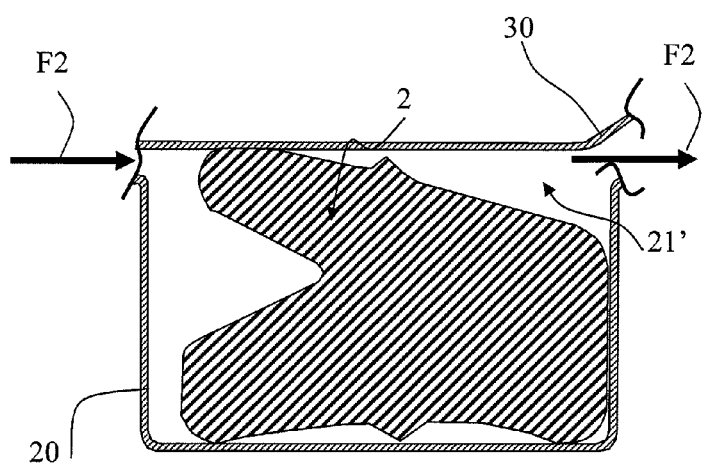
Figure 9:
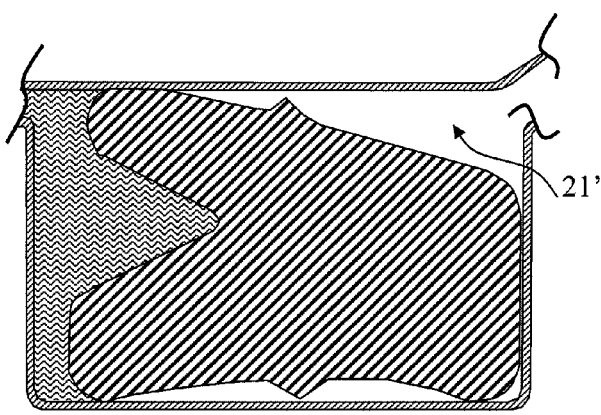
Figure 10:
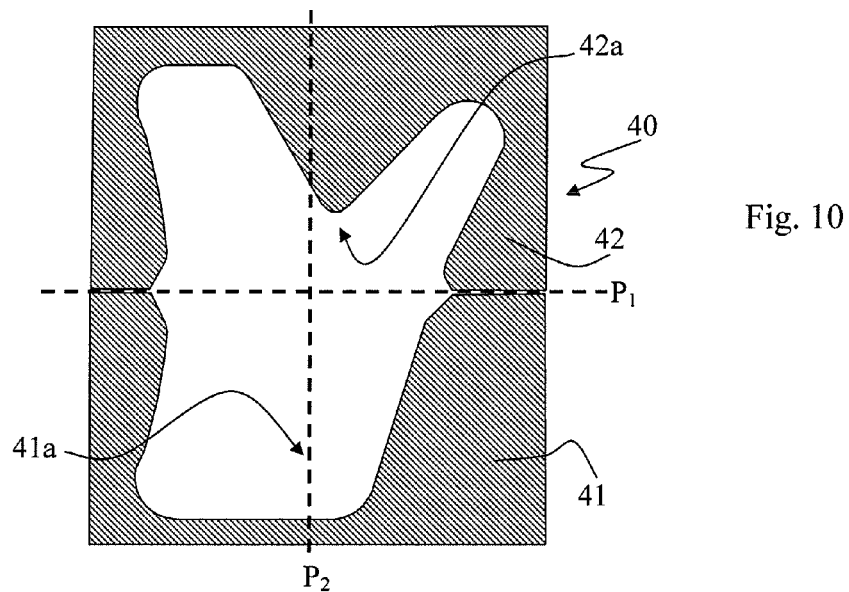
FIGS. 10 to 13: section views showing the method of fabricating a gasket of the invention.
Figure 11:
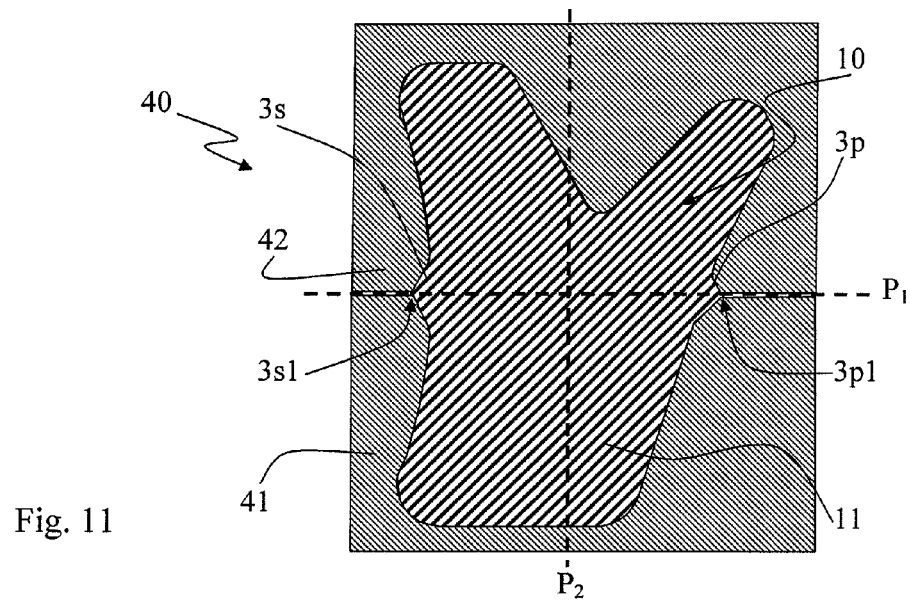
Figures 12, 13:
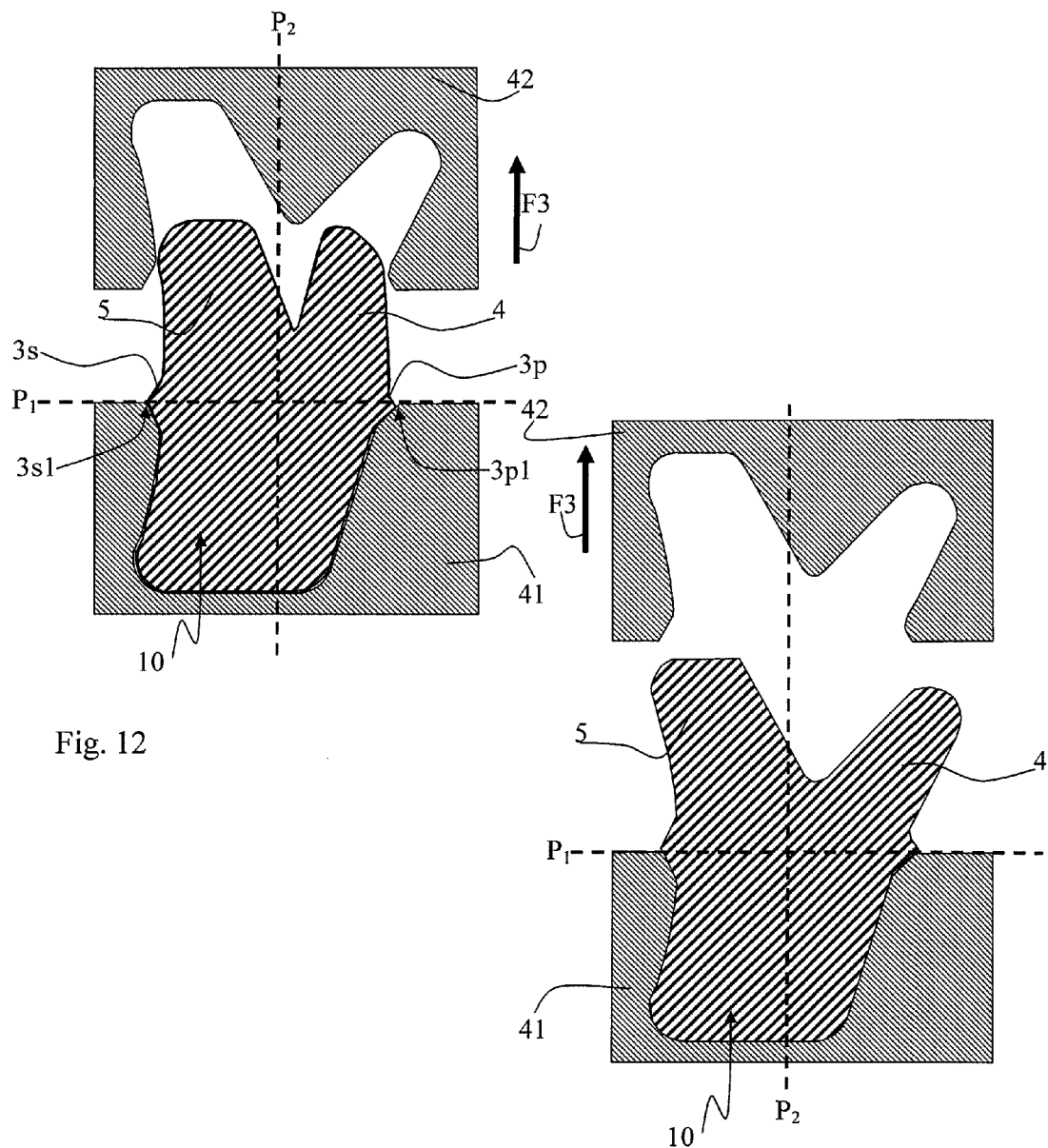

With reference to FIGS. 7 to 9, the gasket 10 is "piston-mounted" and is placed in the groove 21' of an endpiece 20' in such a manner that the V-shaped portion 2 is disposed in a direction F1 opposite to the direction F2 in which the fluid under pressure flows. When the fluid flows (FIG. 9), the secondary lip 5 and the main lip 4 are pressed respectively against the groove 21' and the other endpiece 30 so as to reinforce sealing; pressurization thus takes place in the V-shaped portion of the gasket.

The Y-type gasket provides a large deformation potential for the main lip 4. During connector engagement (FIG. 8), this lip deforms, thereby generating low engagement forces.

Pressurization can take place in one direction only. This is the direction opposite to the engagement direction. In other words, the pressure is applied to the V-shaped portion of the gasket.

The gasket is suitable for sealing fluid (cooling liquid, fuel, etc.) and gas (air, blow-by, etc.).

The gasket may be designed for low pressures (1 bar to 3 bars) or medium pressures (up to 10 bars or 15 bars). The ability to withstand pressure depends to a great extent on the material selected for the gasket. For low pressures, the material may be selected to present hardness of about 60 on the Shore scale, whereas for medium pressures, the hardness of the material may be selected to about 70 on the Shore scale. In particular applications, it is possible to make use of materials presenting hardness of 80 or even 90 on the Shore scale. These values can then be reduced in appropriate manner so that the engagement forces are compatible with the desired values.

Pressurization can also take place in both directions F1 and F2. The gasket of the invention can then perform a membrane function when the fluid flows in the same direction F1 as the orientation of the V-shaped portion 2, and a sealing function when the fluid flows in the direction F2 opposite to the direction F1 in which the V-shaped portion 2 is oriented.

It is also possible to envisage utilization for dynamic sealing with low friction requirements when pressure is applied in one direction only, with lower abrasion and friction requirements.

Finally, after the male and female portions have been mutually engaged, suction is often established in the circuit in the direction of arrow F1 prior to placing it under normal pressure in the direction of arrow F2. The gasket is thus subjected to reverse pressure which would tend to separate the main lip 4 from the endpiece 30, 30', urging it towards the secondary lip 5, and thus preventing suction from being established in the circuit. Surprisingly, because of its special shape, the Y-type gasket of the invention with hardness of about 60 on the Shore scale and presenting a radio U/S lying in the range 0.4 to 0.45 can withstand suction of 1 bar before separating from the endpiece 30, 30', thereby enabling the circuit to be emptied before it is pressurized.

With reference to FIGS. 10 to 13, the gasket of the invention is fabricated in a mold 40 comprising two matrices 41 and 42.

The first matrix 41 is provided with a first cavity 41a having the shape of the I-shaped stem 1, and the second matrix 42 is provided with a second cavity 42a having the same shape of the V-shaped portion 2. At the interface between the two matrices 41 and 42 there is the join plane P1. Because of the shape of this mold 40, the beads 3p, 3s of the join plane are located between the I-shaped stem and the V-shaped portion, substantially perpendicularly to the longitudinal axis P2 of the gasket. In this way, the flash 3p1, 3s1 situated at the tips of the beads 3p, 3s is not located on a functional portion of the gasket 10, i.e. not on the lips nor between them in the recesses separating them.

Preferably, the depths of the two cavities 41a and 42a are substantially equal so as to form beads 3p, 3s carrying join-plane flash 3p1, 3s1 substantially in the middle of the gasket.

The first step in fabricating the gasket 10 with the mold 40 consists in pressing the two matrices 41 and 42 against each other so that the two cavities 41a and 42a face each other (FIG. 1). Then non-cross-linked polymer material 11 is injected into the cavities 41a and 42a of the mold (FIG. 11) via injection gates (not shown) disposed in the join plane and not away from the join plane. Finally, the gasket can be unmolded by moving the matrices apart from each other along arrow F3 once the polymer material 11 has cross-linked sufficiently to enable the main and secondary lips 4 and 5 to deform during unmolding and return to their molded shapes after unmolding. During an additional step, the flash situated at the tips of the beads is removed cryogenically. The gasket is thus taken to a temperature lower than its glass transition temperature, and then fine particles, e.g. of plastics material or of metal, are projected against the gasket. The flash, which is tiny in thickness compared with the gasket, is broken by such particles and eliminated. The gasket is then returned to ambient temperature.

The invention is not limited to the embodiments described and shown:
geometrical modifications can be implemented so as to make the gasket suitable for use in rolled grooves.

With a piston-mount, the inside diameter of the gasket is stretched. The minimum amount of stretch (tolerance calculation) is preferably 3%. The maximum amount of stretch must be less than 10%. With a bore-mount, the outside diameter of the gasket needs to be compressed, and it is this compression that ensures the gasket is stable in the groove. This compression cannot be quantified since it depends on the material and the ratio of the inside diameter of the gasket divided by the section of the gasket. It is appropriate to seek a ratio of less than 10 or as close as possible to that value.

The maximum acceptable compression for the Y-type gasket is about 30%.

The invention claimed is:
1. A sealing gasket of elastically deformable material having a Y-shaped longitudinal axial section for use in a quick coupling for a fluid duct, the gasket comprising an I-shaped stem and a V-shaped portion, flash of join plane (P1) of the gasket being located between the I-shaped stem and the

V-shaped portion substantially perpendicularly to the longitudinal axis (P2) of the gasket.

2. A sealing gasket according to claim 1, wherein the I-shaped stem and the V-shaped portion present maximum axial lengths (X/2) that are substantially equal, the flash of join plane being located between the I-shaped stem and the V-shaped portion, substantially in the middle of the gasket.

3. A sealing gasket according to claim 1 wherein the V-shaped portion determines a main lip and a secondary lip, the ratio of the nominal length (T) of the secondary lip to the nominal length (S) of the main lip being selected to be greater than or equal to 1.2, and no greater than two.

4. A sealing gasket according to claim 1, wherein the ratio of the length (Z) of the main lip in the longitudinal axis direction to the length (X/2) of the secondary lip in the longitudinal axial direction is selected to be strictly less than 1.

5. A sealing gasket according to claim 1, wherein the ratio of the distance (U) between the recess in the V-shaped portion and the join plane to the nominal length (S) of the main lip lies in the range 0.4 to 0.45.

6. A sealing gasket according to claim 1, for insertion in a groove of a first endpiece of the connector and for coming into leaktight contact with a wall of the other endpiece, wherein the ratio of the height (A) of the gasket section in the join plane to the distance (H) between the bottom of the groove and the wall of the second endpiece is selected to be strictly less than 1.

7. A sealing gasket according to claim 1, presenting a maximum radial height (B) between the two lips, wherein the main lip is configured to have an amount of deformation that lies in the range 18% to 22% of the maximum radial height (B).

8. A sealing gasket according to claim 7, wherein the amount of deformation of the secondary lip is less than the amount of deformation of the first lip.

9. A sealing gasket according to claim 8, wherein the secondary lip is configured to have an amount of deformation that lies in the range 9% to 11% of the maximum radial height (B).

10. A sealing gasket according to claim 1, wherein the I-shaped stem and the main lip form respective angles with the longitudinal axis (P2) of the gasket, the angle ($\alpha 1$) of the I-shaped stem being smaller than the angle ($\alpha 2$) of the main lip.

11. A sealing gasket according to claim 10, wherein the angle ($\alpha 1$) of the I-shaped stem is greater than or equal to $2°$, and the angle ($\alpha 2$) of the main lip is less than or equal to $30°$.

12. A sealing gasket according to claim 1, wherein the I-shaped stem and the secondary lip form between them an angle ($\alpha 3$) such that a concave side is provided between the free end of the I-shaped stem and the free end of the secondary lip.

13. A sealing gasket according to claim 1, wherein the secondary lip and the I-shaped stem present respective lobes at their free ends for coming into contact with a groove bottom.

14. A sealing gasket according to claim 1, wherein the main lip presents a free end face that is substantially planar.

15. A sealing gasket according to claim 1, wherein the secondary lip presents a free end face that is substantially planar.

16. A sealing gasket according to claim 1, wherein the I-shaped stem presents a free end face that is substantially planar.

17. A sealing gasket according to claim 1, wherein the I-shaped stem presents a wedging lobe for coming into contact with a groove edge by stressing the gasket in the groove.

18. A sealing gasket according to claim 1, wherein the sealing gasket comprises a material selected from the group consisting of FPM; HNBR; AEM; ACM; NBR; and EPDM.

19. A fluid duct connector comprising a male endpiece and a female endpiece, and including a sealing gasket according to claim 1 for the purpose of reducing the engagement forces for the male and female endpieces.

20. A connector according to claim 19, wherein the gasket is placed in a groove in an endpiece such that the secondary lip bears against the bottom of the groove.

21. A connector according to claim 20, for a pressurized fluid duct, wherein the gasket is placed in the groove of an endpiece such that the V-shaped portion is disposed in a direction opposite to the pressurized fluid flow direction, and when the fluid flows, the main lip and the secondary lip are pressed respectively against the groove and against the other endpiece so as to reinforce sealing.

22. A mold for fabricating a sealing gasket according to claim 1, the mold being characterized in that it comprises a first matrix provided with a first cavity in the form of the I-shaped stem, and a second matrix provided with a second cavity in the form of the V-shaped portion, the depths of the two cavities being substantially such that the flash in the join plane is located between the I-shaped stem and the V-shaped portion.

23. A method of fabricating a gasket, characterized in that it uses the mold according to claim 22, and in that it comprises the steps of:
   pressing the two matrices against each other so that the two cavities face each other;
   injecting or placing non-cross-linked polymer material in the cavity;
   causing said polymer material to cross-link, at least in part; and
   unmolding the gasket by moving the matrices apart from each other, but not until the polymer material has cross-linked sufficiently for the main and secondary lips to be capable of deforming during unmolding and of returning to their molded shapes after unmolding.

24. A sealing gasket according to claim 1, wherein the sealing gasket comprises a polymeric material.

* * * * *